United States Patent [19]
Hausler et al.

[11] 3,731,187
[45] May 1, 1973

[54] TEMPERATURE COMPENSATED FOULING MEASURING METHOD AND APPARATUS

[75] Inventors: Rudolf H. Hausler, Rolling Meadours; Robert W. Sampson, Arlington, both of Ill.

[73] Assignee: Universal Oil Products Company, Des Plaines, Ill.

[22] Filed: Oct. 6, 1971

[21] Appl. No.: 186,888

[52] U.S. Cl. ............................................. 324/65 R
[51] Int. Cl. .............................................. G01r 27/02
[58] Field of Search ....................... 324/65 CR, 65 R, 324/71 R

[56] References Cited

UNITED STATES PATENTS

| | | | |
|---|---|---|---|
| 3,609,549 | 9/1971 | Hausler et al. | 324/65 R |
| 2,824,283 | 2/1958 | Ellison | 324/65 R |
| 2,987,685 | 6/1961 | Schaschl | 324/65 CR |
| 3,067,386 | 12/1962 | Freedman | 324/65 CR |

*Primary Examiner*—Stanley T. Krawczewicz
*Attorney*—James R. Hoatson, Jr. et al.

[57] ABSTRACT

An apparatus and method for measuring material buildup or fouling on a test specimen in which at least a portion of a temperature sensitive voltage output means is located proximate to a test specimen. The extent of fouling is determined by the change in current value or voltage value resulting from the change in the heat transfer coefficient of the test specimen. The temperature sensitive voltage output means is at the same temperature as the temperature of the medium in which the test specimen resides and adjusts either the current value or voltage value to negate the effects of varying temperature of the medium on the other value across the test specimen.

6 Claims, 1 Drawing Figure

PATENTED MAY 1 1973 3,731,187
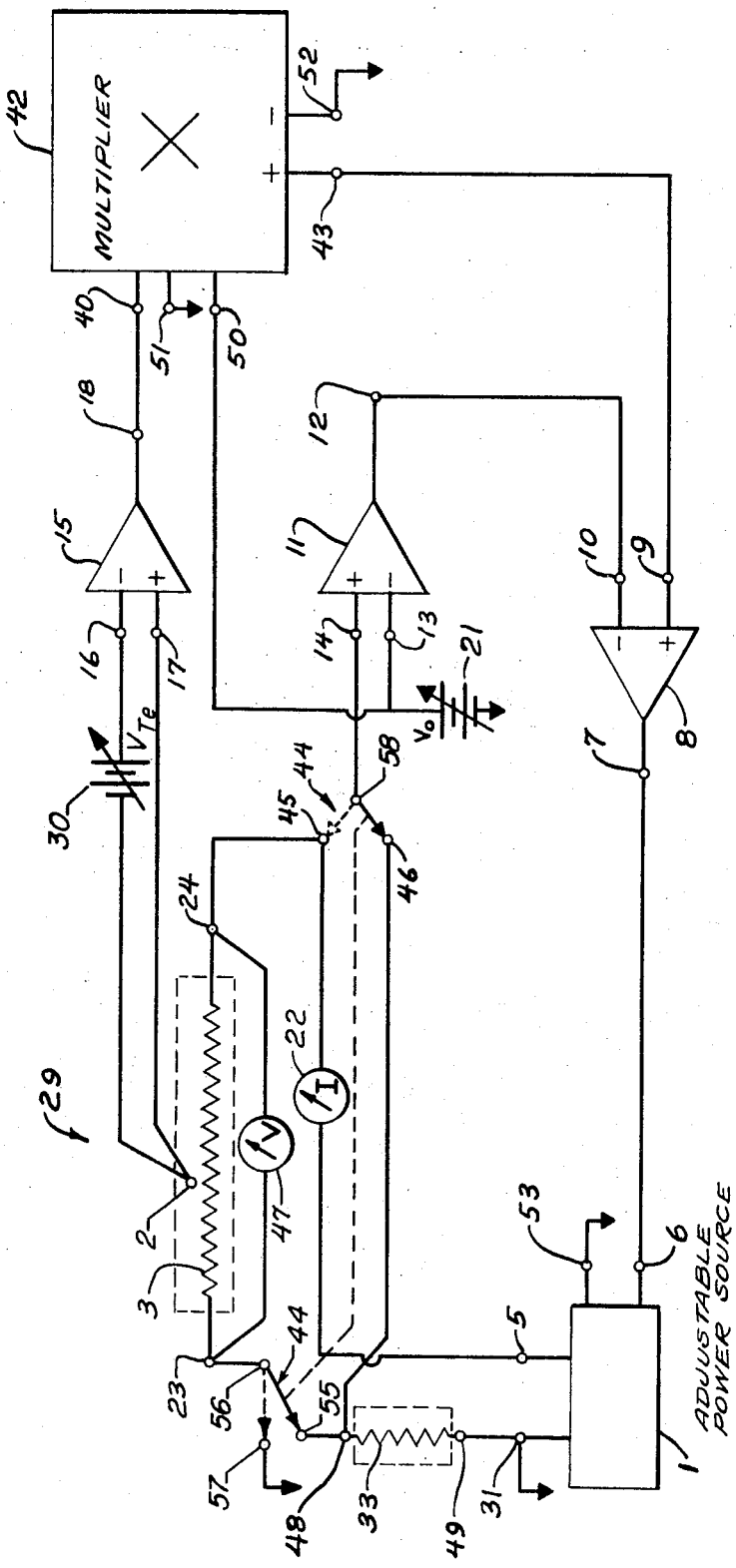

TEMPERATURE COMPENSATED FOULING MEASURING METHOD AND APPARATUS

FIELD OF THE INVENTION

The present invention is directed to an apparatus and method which is used to determine the extent of fouling on surfaces in environments where fouling may occur and wherein it is desirable to determine the extent of such fouling. It is related to U.S. Pat. No. 3,609,549, issued to us on Sept. 28, 1971.

That patent related to an improved measuring device in which at least a portion of a temperature sensitive voltage output means was located proximate to a corrosion test specimen. The corrosion test specimen was located in a circuit having a stable and normally constant input voltage. The extent of corrosion was determined by the decrease in current resulting from the increase in resistance of the test specimen as it corroded over a period of time. The temperature sensitive voltage output means was at the same temperature as the test specimen and adjusted the input voltage to negate the effects of varying temperature on the current flowing through the test specimen.

BACKGROUND OF THE INVENTION

It is frequently desirable to determine the extent of fouling of surfaces through laboratory or field testing. Such testing is useful to indicate what species of antifouling agent may be used satisfactorily and to determine whether the fouling of the surface has made the apparatus inefficient as a heat exchange device or the like. Fouling may be determined in different ways, although some have proved to be impractical. The most frequently used method is to insert a probe into the fouling environment and after a predetermined time period remove the probe and weigh the same to determine material buildup. This procedure cannot be made continuous and may not indicate whether the surface is actually being blocked or made inefficient by the material buildup.

SUMMARY OF THE INVENTION

Accordingly, it is an object of this invention to provide a fouling measuring device which may be used to continuously measure the extent of fouling of a surface.

Another object of this invention is to provide for the method of measuring the extent of fouling of a surface.

In a broad aspect the present invention provides for a method of measuring the material buildup on the surface of a probe by determining the heat transfer coefficient (K) of a given surface area (F) of the probe, (K) being defined as the amount of energy which can be passed through the unit surface per unit time and per unit of temperature measurement, said probe being disposed in an environment having a reference temperature ($T_e$), said probe having a resistance ($R_e$) at the reference temperature ($T_e$) and a temperature coefficient of resistivity ($\alpha_2$) defined for said reference temperature ($T_e$), comprising the steps of: (a) establishing a voltage value (V) across said probe and a current value (I) through said probe; (b) detecting a signal representing one of the aforesaid values as the dependent variable; (c) detecting a signal representing the other aforesaid value at the reference temperature ($T_e$); (d) adjusting the other aforesaid value as the independent variable to compensate for changes in resistivity of the probe due to incidental temperature deviations of the environment such that the voltage (V) at a constant instantaneous (K) is equal to the voltage value ($V_e$) plus or minus a correction voltage value ($|\Delta V|$), $V_e$ being the voltage at the reference temperature ($T_e$), and the current (I) at a constant instantaneous (K) is equal to the current value ($I_e$) plus or minus a correction current value ($|\Delta I|$), $I_e$ being the current at the reference temperature ($T_e$), and such that the correction value associated with the dependent variable of step (b) is equal to 0; and, (e) determining (K) according to the relationship;

$$K = \frac{(V \pm |\Delta V|)(I \pm |\Delta I|)^2 \alpha_2 R_e}{[(V \pm |\Delta V|) - (I \pm |\Delta I|) R_e] F}$$

whereby a change in the dependent variable of step (b) will indicate a change in (K) independent of temperature changes of the environment.

In another aspect the present invention provides for an apparatus for measuring the material buildup on the surface of a probe in an environment having incidental temperature deviations by detecting an electrical signal value dependent on the heat transfer coefficient (K) of a given surface area of the probe comprising in combination: (a) first means for establishing a voltage value (V) across said probe and a current value (I) through said probe, (b) second means for detecting a signal representing one of the aforesaid values as the dependent variable; and, (c) third means for adjusting the other aforesaid value as the independent variable to compensate for changes in resistivity of the probe due to incidental temperature deviations of the environment whereby the dependent variable will indicate a change in (K) independent of temperature changes of the environment.

As set forth above, (K), the heat transfer coefficient, is defined as the amount of energy which can be passed through a given surface, per unit time per unit temperature. Any layer of solid material buildup or a surface will reduce (K). Therefore fouling can be determined and observed as a function of time by measuring (K).

Reference to the drawing and the following description thereof will serve to more fully describe the present invention as well as set forth additional advantageous features thereof.

DESCRIPTION OF THE DRAWING

The drawing is a diagram of a resistance probe fouling measuring device utilizing the present invention.

The invention illustrated in the drawing is a resistance probe fouling measuring device having a stable, adjustable power source 1, an electrically conductive test specimen 3, current sensing means 22 and voltage sensing means 47. The invention comprises a temperature sensitive voltage output means 29, having a portion 2 proximately located with respect to test specimen 3. The power source 1 is adjusted to compensate for temperature changes of the test specimen 3 due to environment temperature changes in which the probe is placed.

The stable, adjustable power source 1 has a first output terminal 31 and a second output terminal 5 and is connected in the circuit with the first output terminal 31 connected to the circuit reference. The second output terminal 5 is connected to the current sensing means 22. The fouling test specimen 3 has a first end 23 and a second end 24 and is connected in the circuit with the first end connected to terminal 56 of a switch 44. The second end 24 is connected to terminal 45 of a switch 44 and current sensing means 22. A voltage sensing means 47 is also connected across the fouling test specimen 3. A terminal 49 of a resistor 33 is connected to the circuit reference while a current sensing terminal 48 of resistor 33 is connected to a terminal 46 and a terminal 55 of switch 44. The adjustable power source 1, resistor 33, test specimen 3, and current sensing means 22 are series connected in the circuit when switch 44 is set for constant current control. The resistor 33 is disconnected from the circuit when switch 44 is set for constant voltage control. The current sensing means 22 may be an ammeter, a current sensing recorder, or other current sensing devices, while on the other hand the voltage sensing means 47 may be a voltmeter, a voltage sensing recorder, or other voltage measuring devices. Two devices may well be used to accomplish the voltage and current detecting of the invention; however, a combination device may well be used. A first differential input operational amplifier 8 has an output 7 connected to an error voltage input terminal 6 of the adjustable power source 1. Operational amplifier 8 has a first input terminal 9 connected to output terminal 43 of multiplier 42. Operational amplifier 8 also has a second input terminal 10. A second differential input operational amplifier 11 has an output 12 connected to the second input terminal 10 of first differential input operational amplifier 8. Operational amplifier 11 has a first input terminal 14 and a second input terminal 13.

The voltage output means which is the thermocouple 29 has a temperature sensitive portion 2 proximately located with respect to the test specimen 3. Although a thermocouple is used in the preferred embodiment the voltage output means may be comprised of a thermistor and a voltage source such as a battery or the like. An operational amplifier 15 has input terminals 16 and 17 connected to the output terminals of thermocouple 29 with a bucking voltage source 30 in series with thermocouple 29 and input terminal 16. Operational amplifier 15 also has an output 18 connected to a first input terminal 40 of a multiplier 42. Bucking voltage source 30 is used to reference thermocouple 29 to the temperature $T_e$. Although thermocouple and bucking voltage sources are used, a single thermocouple may be used along with an operational amplifier with an internal thermocouple reference.

A variable reference voltage source 21 is connected to input terminal 13 of operational amplifier 11 and the second input terminal 50 of multiplier 42. The common input terminal 51 of multiplier 42 is connected in the circuit reference. The input terminal 14 of operational amplifier 11 is connected to the common terminal 58 of switch 44. Other terminals of switch 44 are designated by numerals 45 and 46. Terminal 45 is common to terminal 24, the voltage sensing terminal of probe 3. Terminal 46 connects to the current sensing terminal 48 of resistor 33.

A portion of the circuitry of the drawing is a simplified form of a conventional potentiostat. That is, the circuitry comprising the adjustable power source 1, operational amplifiers 8 and 11, the reference voltage source 21, the connections to first and second ends 23 and 24 of the test specimen 3 via terminal 45, and the connection to resistor 33 via terminal 46, function in the same manner as a simple, conventional potentiostat. The novelty of this invention resides in the incorporation of a voltage output means having a temperature sensitive portion adjacent to the probe which will adjust the power source to compensate for temperature variations of the environment in which the probe is placed.

In the operation of this invention, there is a voltage (V) appearing across the test specimen 3 and a current (I) flowing through the specimen initiating from power source 1. For the instrument depicted to successfully evaluate changes of (K) with fouling of the surface area F of probe 3, either (V) or (I) must be maintained at a constant value and thus establish the independent variable with the exception that the one chosen as the independent variable must be adjusted to negate any changes in the other value due to temperature variations of the test specimen or probe 3.

Switch 44 is used to change the circuitry to allow either the current (I) through the probe or the voltage (V) across the probe to be the dependent variables. When the common switch terminal 58 is in contact with terminal 45 and the common switch terminal 56 is in contact with terminal 57 the voltage (V) across the probe would be referenced to the voltage ($V_o$). Thus the current (I) through the probe would be the dependent variable indicating changes in (K). Because the current sensing means 22 is in series with the probe, the current detected in sensing means 22 would be the dependent variable current value (I).

When the common switch terminal 58 is in contact with terminal 46 and the common switch terminal 56 is in contact with terminal 55 the voltage drop between the terminals 48 and 49 of resistor 33 (e.g. the current through the probe) is referenced to the voltage ($V_o$). Thus the voltage across the probe would be the dependent variable indicating changes in (K). Because the voltage sensing means 47 is connected across the probe the voltage detected in sensing means 47 would be the dependent variable voltage value (V).

Since the resistance of the test specimen 3 will normally increase with an increase in temperature or decrease with a decrease in temperature, the independent variable, which is either the voltage (V) or the current (I), must be increased or decreased accordingly so that there is no change in value of the dependent variable due to temperature variations of the environment at any instantaneous value of (K).

The various components of the invention are well known devices. The thermocouple 29 is a voltage source which varies with temperature and the bucking voltage source 30 is set to a specific thermocouple reference voltage $V_{Te}$. Operational amplifier 15 multiplies the input voltage ($V_{th}$) by a gain factor which is equal to $\alpha 2/\alpha 1$ where $\alpha 2$ is equal to the temperature coefficient of the resistance of probe 3 defined at the reference temperature of the thermocouple and $\alpha 1$ is the temperature coefficient of the thermocouple defined at the same temperature. Multiplier 42 multiplies the input signals of terminals 40 and 50 to result in a correction signal utilized to compensate for temperature changes which appear at output terminals 52 and 43. Terminal 52 of multiplier 42 is connected to the circuit reference while terminal 43 is connected to the input terminal 9 of operational amplifier 8.

Each of the differential input operational amplifiers 8 and 11 in the system modifies the difference in voltage applied to its inputs. That is, the voltage on the inverting (−) input terminals may be considered to be subtracted from the voltage of the noninverting (+) input terminal, and the resultant differential voltage times a gain factor appears at the operational amplifier output.

Considering a general case where the temperature within the environment changes and consequently the temperature of the probe 3 changes, a voltage $V\text{th} = \alpha_1 \Delta T$ will result at the input terminals 16 and 17 of amplifier 15. This signal is multiplied by a gain factor which is equal to $(\alpha_2/\alpha_1)$ and appears at input terminal 40 of multiplier 42. The voltage $(\alpha_2/\alpha_1)(V_{th})$ is multiplied by voltage $V_o$ in multiplier 42 to result in a voltage signal $V_o(\alpha_2/\alpha_1)(V_{th}) = V_o \alpha_2 \Delta T$ at the output terminal 43 of the multiplier 42. If a decision is made that a particular temperature of the environment is the reference temperature $(T_e)$, the temperature reference voltage source 30 is set to make the voltage level at terminal 43 equal to 0. Any change from $(T_e)$ would result in a correction signal $V_o \alpha_2 (T-T_e)$ at terminal 43 of multiplier 42 and thus at input terminal 9 of amplifier 8.

Any change in environment temperature that would result in a change in voltage at terminals 16 and 17 of amplifier 15 would also give a corresponding change in the voltage level at input terminal 14 in either position of switch 44 due to a change in resistivity of probe 3. The voltage at output terminal 12 of amplifier 11 is the result of the gain factor of amplifier 11 times the difference in voltage at input terminal 13 and 14. The voltage signal from output terminal 12 is common to the voltage signal of input terminal 10 of amplifier 8 and the voltage signal of input terminal 9. The output signal of amplifier 8, terminal 7 is connected to control input terminal 6 of the power source 1. The other control input terminal 53 is connected to the circuit reference. It can be seen that if there is a difference in voltage at terminal 14 from the reference voltage $V_o$ of terminal 13 not due to change in temperature, the correction output signal of amplifier 8 would only represent enough change to result in a voltage $V_o$ at terminal 14.

It can be seen that the voltage at control terminal 14 will change to offset a change in either voltage or current through the probe resulting from a resistance change when the temperature of the environment changes if no temperature compensation is used. If the environment temperature changes the resistance of the probe will change from $R_e$, the resistance at the reference temperature, to $R_e + \alpha_2 R_e (T-T_e)$. The corresponding voltage change across the probe 3 will be $\alpha_2 V_{pe}(T-T_e)$. If the voltage drop across resistor 33 is being used for current control its resistance change will also be $\alpha_2 R_e (T-T_e)$ and corresponding voltage change $\alpha_2 V_{pe}(T-T_e)$ because $R_{33} = R_e$, $\alpha_{33} = \alpha_2$, and the resistor 33 is in the same environment as probe 3. As indicated above at temperature $T_e$ the voltage at terminal 14 of operational amplifier 11 will be $V_o$ thus the voltage across the probe or resistor 33 at $T_e$ will also be $V_o$ and the change in voltage will be $\alpha_2 V_o (T-T_e)$. If the voltage difference of terminals 14 and 13 represented a voltage change due to a change in environment temperature the correction output signal of amplifier 11 would be $\alpha_2 V_o (T-T_e)$ if the gain of amplifier 11 is one. This voltage is applied to input terminal 10 of amplifier 8 while the temperature correction signal $\alpha_2 V_o (T-T_e)$ from multiplier 42 is being applied to terminal 9 of amplifier 8. The output of amplifier 8 at terminal 7 will remain at zero.

The temperature compensation present in this invention will vary the voltage level at terminal 9 with the environment temperature to offset the voltage change at terminal 10. This leaves the dependent variable chosen as either (I) or (V), the only variable affecting current. Thus, (K) can be accurately determined by looking at the dependent variable.

As set forth hereinbefore the general formula for determination of (K) is:

$$K = \frac{(V \pm |\Delta V|)(I \pm |\Delta I|)^2 \alpha_2 R_e}{[(V \pm |\Delta V|) - (I \pm |\Delta I|) R_e] F}$$

where either $(|\Delta V|)$ or $(|\Delta I|)$ is made equal to 0 depending on the choice of the dependent variable. $(|\Delta V|)$ and $(|\Delta I|)$ as set out before are the changes in either voltage or current due to temperature compensation, not the changes due to changes in (K) values.

If current (I) is chosen as the dependent variable, then $(|\Delta I|)$ is equal to O. The voltage (V) is referenced to $(V_o)$ and thus the common terminal 58 of switch 44 is set to contact terminal 45 and common terminal 56 is set to contact terminal 57. The voltage $(V_e)$ is detected at the reference temperature $(T_e)$ and since $(V_e)$ is always equal to $(V \pm |\Delta V|)$ the formula is rewritten according to:

$$K = \frac{V_e I^2 \alpha_2 R_e}{[V_e - I R_e] F}$$

where (I) is the only component that varies with (k).

If voltage (V) is chosen as the dependent variable, then $(|\Delta V|)$ is equal to O. The voltage drop $(I R_{33})$ across terminals 48 and 49 of resistor 33 is referenced to $V_o$ and thus the common terminal 58 of switch 44 is set to contact terminal 46 and common terminal 56 is set to contact terminal 55. The current $(I_e)$ is detected at the reference temperature $(T_e)$ and since $(I_e)$ is always equal to $(I \pm |\Delta I|)$ the formula is rewritten according to:

$$K = \frac{V I_e^2 \alpha_2 R_e}{[V - I_e R_e] F}$$

where (V) is the only component that varies with (K).

It is to be understood that each of the operational amplifiers depicted has its own power source and feedback networks and may be of any conventional design used to achieve the specified functions as previously explained. With modifications, other temperature sensing devices may also be used. The temperature sensing device illustrated is only an example of obtaining the desired current and voltage values. The use of other conventional means for accomplishing the same result is contemplated within the scope of this invention. While the correction factor utilized has been shown to be $V_o(\alpha_2/\alpha_1) V_{th}$ modifications may be utilized to obtain the desired result. The invention will be operable as long as the operational amplifiers are chosen so as to convert the voltage change from the temperature sensitive voltage output means into a voltage change at the control terminal 9 which will exactly compensate for the resistance change of the test specimen 3 due to temperature changes.

The reference voltage source 21 may be a battery or any other type of constant voltage source. For a given test specimen and for known operational amplifiers, the reference voltage source may be one having a fixed potential, through as a practical matter it is depicted as a variable voltage source as in a conventional potentiostat so as to accommodate different test specimens, operational amplifiers, and voltage output means.

The foregoing description and illustration of the embodiments of this invention are for purposes of illustration only, and no unnecessary limitations should be construed therefrom as other modifications will be obvious to those skilled in the art.

We claim as our invention:

1. Method of measuring the material buildup on the surface of a probe by determining the heat transfer coefficient (K) of a given surface area (F) of the probe, (K) being defined as the amount of energy which can be passed through the unit surface per unit time and per unit of temperature measurement, said probe being disposed in an environment having a reference temperature ($T_e$), said probe having a resistance ($R_e$) at the reference temperature ($T_e$) and a temperature coefficient of resistivity ($\alpha_2$) defined for said reference temperature ($T_e$), comprising the steps of:
   a. establishing a voltage value (V) across said probe and a current value (I) through said probe;
   b. detecting a signal representing one of the aforesaid values as the dependent variable;
   c. detecting a signal representing the other aforesaid value at the reference temperature ($T_e$);
   d. adjusting the other aforesaid value as the independent variable to compensate for changes in resistivity of the probe due to incidental temperature deviations of the environment such that the voltage (V) at a constant (K) is equal to the voltage value ($V_e$) plus or minus a correction voltage value ($|\Delta V|$), ($V_e$) being the voltage at the reference temperature ($T_e$), and the current (I) at a constant (K) is equal to the current value ($I_e$) plus or minus a correction current value ($|\Delta I|$), ($I_e$) being the current at the reference temperature ($T_e$), and such that the correction value associated with the dependent variable of step (b) is equal to 0; and,
   e. determining (K) according to the relationship:

$$K = \frac{(V \pm |\Delta V|)(I \pm |\Delta I|)^2 \alpha_2 R_e}{[(V \pm |\Delta V|) - (I \pm |\Delta I|) R_e] F}$$

whereby a change in the dependent variable of step (b) will indicate a change in (K) is independent of temperature changes of the environment.

2. The method according to claim 1 wherein the voltage value (V) is made the dependent variable so that the correction voltage ($|\Delta V|$) is equal to 0.

3. The method according to claim 1 wherein the current value (I) is made the dependent variable so that the correction current ($|\Delta I|$) is equal to 0.

4. Apparatus for measuring the material buildup on the surface of a probe in an environment having incidental temperature deviations by detecting an electrical signal value dependent on the heat transfer coefficient (K) of a given surface area of the probe comprising an combination:
   a. first means connected to said probe for establishing a voltage value (V) across said probe and a current value (I) through said probe;
   b. second means connected to said first means for detecting a signal representing one of the aforesaid values as the dependent variable; and,
   c. third means connected to said first means for adjusting the other aforesaid value as the independent variable to compensate for changes in resistivity of the probe due to incidental temperature deviations of the environment whereby the dependent variable will indicate a change in (K) due to material buildup and independent of temperature changes of the environment.

5. Apparatus according to claim 4 wherein that the voltage value (V) is the dependent variable.

6. Apparatus according to claim 4 wherein that the current value (I) is the dependent variable.

* * * * *